US010436326B2

(12) United States Patent
Rosenberger et al.

(10) Patent No.: US 10,436,326 B2
(45) Date of Patent: Oct. 8, 2019

(54) SEALING SYSTEM AND A VALVE PROVIDED THEREWITH

(71) Applicant: FESTO AG & Co. KG, Esslingen (DE)

(72) Inventors: Ralf Rosenberger, Weinstadt (DE); Jakob Brenner, Esslingen (DE); Martin Kilb, Stuttgart (DE)

(73) Assignee: FESTO AG & CO. KG, Esslingen (DE)

( * ) Notice: Subject to any disclaimer, the term of this patent is extended or adjusted under 35 U.S.C. 154(b) by 46 days.

(21) Appl. No.: 15/673,841

(22) Filed: Aug. 10, 2017

(65) Prior Publication Data
US 2018/0045312 A1 Feb. 15, 2018

(30) Foreign Application Priority Data
Aug. 15, 2016 (DE) .................. 10 2016 215 154

(51) Int. Cl.
| | |
|---|---|
| *F16K 27/08* | (2006.01) |
| *F16J 15/02* | (2006.01) |
| *F15B 13/08* | (2006.01) |
| *F16K 27/12* | (2006.01) |
| *F16K 27/00* | (2006.01) |

(52) U.S. Cl.
CPC .......... *F16J 15/025* (2013.01); *F15B 13/0821* (2013.01); *F16K 27/00* (2013.01); *F16K 27/08* (2013.01); *F16K 27/12* (2013.01)

(58) Field of Classification Search
CPC .......... F16J 15/02; F16J 15/021; F16J 15/025; F15B 13/0821; F16K 27/00; F16K 27/08; F16K 27/12
See application file for complete search history.

(56) References Cited

U.S. PATENT DOCUMENTS

| | | | | |
|---|---|---|---|---|
| 4,457,523 | A  * | 7/1984 | Halling | .................. F16J 15/021 |
| | | | | 277/644 |
| 8,292,081 | B2 * | 10/2012 | Sasaki | ............... H01L 21/67376 |
| | | | | 206/710 |

(Continued)

FOREIGN PATENT DOCUMENTS

| | | |
|---|---|---|
| CN | 103370563 A | 10/2013 |
| CN | 205101554 U | 3/2016 |

(Continued)

*Primary Examiner* — Ian G Paquette
(74) *Attorney, Agent, or Firm* — Hoffmann & Baron, LLP (57) ABSTRACT

A sealing system which has an annular seal which is used for sealing between a first member and a second member and which has a base portion, from which there projects axially in the direction towards the second member a sealing lip which ends in an end-side sealing portion which abuts an annular sealing face of the second member in a sealing manner. The annular sealing face has a conical first sealing face portion and a second sealing face portion which adjoins it in a radially outward direction, wherein the portion is formed by the base face of an annular indentation of the second member. The sealing lip tapers in the direction towards the sealing portion thereof and in the position for use thereof is axially compressed by the action by means of the two members and at the same time curved radially inwards. The sealing system is in particular a component of a valve.

22 Claims, 5 Drawing Sheets

Fig. 4

(56) References Cited

U.S. PATENT DOCUMENTS

| | | | | |
|---|---|---|---|---|
| 8,720,693 B2* | 5/2014 | Nagashima | ....... | H01L 21/67376 |
| | | | | 206/454 |
| 2002/0195455 A1* | 12/2002 | Takahashi | .............. | B65D 53/02 |
| | | | | 220/806 |
| 2006/0081635 A1* | 4/2006 | Matsutori | .............. | F16J 15/025 |
| | | | | 220/378 |
| 2009/0261533 A1* | 10/2009 | Inoue | ..................... | F16J 15/025 |
| | | | | 277/648 |
| 2013/0264225 A1 | 10/2013 | Miyagawa | | |
| 2015/0333437 A1 | 11/2015 | Zagroun et al. | | |

FOREIGN PATENT DOCUMENTS

| | | |
|---|---|---|
| DE | 69720312 | 2/2004 |
| DE | 10316519 | 11/2004 |
| DE | 102007047703 | 4/2008 |

\* cited by examiner

SEALING SYSTEM AND A VALVE PROVIDED THEREWITH

BACKGROUND OF THE INVENTION

The invention relates to a sealing system having an annular seal which is inserted in the position for use thereof axially between two first and second members, which are opposite each other in an axial direction and which are intended to be sealed relative to each other, and which is in sealing contact with these two members, wherein it has, in order to seal with respect to at least the second member, an annular sealing projection which extends axially from a base portion in the direction towards the second member and which abuts with a freely ending, end-side sealing portion against an annular sealing face of the second member facing the first member. The invention further relates to a valve which is provided with such a sealing system.

A sealing system of this type known from DE 196 21 261 A1 comprises a plate-like sealing arrangement which comprises a flexurally rigid carrier plate and annular seals formed thereon. The annular seals are constructed in a strip-like manner and each have a substantially trapezoidal base portion which is fixed to the carrier plate and a bead-like sealing projection which projects axially from this base portion. In the position for use thereof, the sealing arrangement is inserted between two members which are intended to be sealed relative to each other, wherein it abuts one of the two members with sealing with a freely ending end-side sealing portion of the sealing projection.

A disadvantage of the known sealing system is that it allows only small tolerance compensation as a result of the small deformation capacity of the seal. In particular a reliable seal between two axially mutually adjoining members cannot be ensured if the axial spacing between the two members varies as a result of tolerances. Therefore, narrow tolerances must be complied with during the production of the members which are intended to be sealed relative to each other, which is at the expense of the production costs.

DE 697 20 312 T2 discloses a multiple valve which is provided with a mask-like sealing means in order to mutually seal two members which are intended to be placed against each other. The sealing means has a carrier which comprises a sieving material and on which a bead which serves to seal and which comprises an elastomer material is formed.

DE 10 2007 047 703 A1 discloses a valve device having a plurality of mutually adjoining block-like members. There is inserted between adjacent members a frame-like seal which has two sealing portions which are arranged with radial spacing from each other and which are connected to each other by a web-like intermediate region. When the two members are connected to each other, the sealing portions are axially pressed between the two members. This seal is also poorly suitable for compensating for production tolerances.

US 2013/0264225 A1 describes a water-tight structure for electronic devices such as Smartphones or tablet computers. There is inserted between two housings a seal which has an annular sealing projection. When the sealing system is assembled, the orientation of the sealing projection changes from an initially linear orientation to an oblique orientation as a result of a rotation with respect to a base portion.

DE 103 16 519 A1 relates to a sealing arrangement which is used in motor vehicles for sealing between the bodywork and the engine bonnet. The sealing arrangement has a seal which is fixed to the bodywork and which abuts a sealing face of the engine bonnet with a sealing lip. This sealing face extends obliquely in a radially outward direction and at the same time approaches the bodywork.

US 2015/0333437 A1 describes the sealing of two components of an electrical plug type connection. An annular seal is inserted between the socket portion and the connector portion of a plug type connection device and has a sealing lip which tapers towards the free end thereof and which is curved radially outwards in the position for use thereof.

SUMMARY OF THE INVENTION

An object of the invention is to provide a sealing system for the mutual sealing of two members which also ensures a reliable seal in the case of great production tolerances and which can be produced in a cost-effective manner.

In order to achieve this object, there is provision in connection with the features mentioned in the introduction for the annular sealing face of the second member to have a conical first sealing face portion which extends obliquely in a radially outward direction with axial movement away from the first member from an inner end region to an outer end region and which merges at the outer end region thereof into a second sealing face portion of the annular sealing face which is formed by the base face of an annular indentation of the second member, wherein the sealing projection is formed by a sealing lip which tapers in the direction towards the sealing portion and which in the position for use of the seal is axially compressed by axial action by means of the annular sealing face of the second member and which is curved radially inwards with resilient deformation in the intermediate region which is located between the sealing portion and the base portion.

The object is further achieved by a valve for controlling fluid flows having a valve housing which has two housing portions, which form two first and second members of a sealing system which are opposite each other in an axial direction and which are intended to be sealed relative to each other, which sealing system further has an annular seal which is inserted axially between the two members in the position for use thereof and which is in sealing contact with these two members and which has, for sealing with respect to at least the second member, an annular sealing projection which extends from a base portion axially in the direction towards the second member and which abuts an annular sealing face of the second member facing the first member with a freely ending end-side sealing portion, wherein the annular sealing face of the second member has a conical first sealing face portion which extends obliquely in a radially outward direction with axial movement of the first member away from an inner end region to an outer end region and which merges at the outer end region thereof into a second sealing face portion of the annular sealing face which is formed by the base face of an annular indentation of the second member, wherein the sealing projection is formed by a sealing lip which tapers in the direction towards the sealing portion and which in the position for use of the seal is axially compressed by axial action by means of the annular sealing face of the second member and which is curved radially inwards with resilient deformation in the intermediate region which is located between the sealing portion and the base portion.

In the sealing system which is constructed according to the invention and which preferably is incorporated into a valve of the aforementioned kind, the annular seal has a sealing lip which produces the sealing with respect to the second member and which tapers in terms of cross-section in the direction towards the free end thereof facing away from the first member and which terminates in an end-side sealing portion which is ideally introduced in the assembled state of the two members in an annular indentation of the second member, which indentation is open in the direction towards the first member. The base face of this annular indentation forms a second sealing face portion, which is provided to cooperate in a sealing manner with the sealing lip, in respect of an annular sealing face which is formed on the second member and which further also has an annular first sealing face portion which adjoins the second sealing face portion radially inwards. The first sealing face portion is constructed in a conical manner and extends from an inner end region with an oblique extent radially outwards as far as an outer end region which merges into the second sealing face portion. The oblique extent of the first sealing face portion with respect to the axial direction has the positive effect that the sealing lip can slide thereon with the sealing portion thereof and is directed to the annular indentation if the two members are axially assembled and as a result of production tolerances the sealing portion of the sealing lip is not precisely axially aligned with the annular indentation. Consequently, a self-centring effect is produced. The conical first sealing face portion further affords the advantage that the sealing contact between the sealing lip and the second member is not lost when the sealing lip becomes deformed radially inwards as a result of an outer excess pressure. Although the sealing lip may be discharged from the annular indentation, it continues to abut the conical first sealing face portion with the sealing portion thereof. Furthermore, the sealing effect of the sealing lip is subjected to pressure support irrespective of whether it is acted on with a pressure difference in favour of the radial outer side thereof or in favour of the radial inner side thereof. In both cases, the sealing lip is pressed on the sealing face by the differential pressure which is applied thereto in addition to the inherent resilience forces. The formation of the sealing lip tapering towards the sealing portion promotes not only the deformation behaviour but also the production by an injection-moulding method as a result of the optimum ability to be removed from the mould. However, the seal provides a great level of tolerance compensation not only in a radial direction but also in an axial direction because it can be axially compressed with little connection force by the assembly forces of the two members acting axially thereon, wherein the compensation for the axial compression results in a radially inwardly orientated curvature of the intermediate region of the sealing lip located between the base portion and the sealing portion. The sealing lip is preferably constructed in such a manner that the intermediate region is clearly and unilaterally curved radially inwards during the axial compression of the sealing lip, which has the positive effect that the bending sealing lip can be placed against the first sealing face portion to an increasing extent.

It is particularly advantageous if the sealing system is integrated in a valve which serves to control fluid flows, wherein the two members of two housing portions of a valve housing of the valve are formed, which members are sealed relative to each other.

Advantageous developments of the invention will be appreciated from the dependent claims.

The sealing system is preferably configured in such a manner that the sealing lip in the position for use of the seal is ideally introduced into the annular indentation with the end-side sealing portion thereof and moves into abutment therein with sealing against the second sealing face portion.

The sealing lip preferably abuts the conical first sealing face portion with the end-side sealing portion thereof in a radially slidingly displaceable manner. It can thereby be redirected radially outwards during the axial assembly of the two members and can be pressed into the annular indentation. Furthermore, the sealing lip can slide on the first sealing face portion while maintaining the sealing function if it is subjected during operation to varying radial differential pressures.

The second sealing face portion which is formed by the base face of the annular indentation advantageously has, when viewed in cross-section, a curved, that is to say, rounded, shape. In principle, however, the annular indentation may also have on the base face thereof a characteristic corner.

Preferably, the second member is provided with a conical introduction face which is located upstream of the annular indentation in the direction towards the first member. This introduction face is orientated axially in the direction towards the first member and at the same time radially inwards so that the diameter surrounded thereby expands in the direction towards the first member. If the two members are axially assembled with a radial offset with respect to each other, the sealing lip can partially strike the conical introduction face with the end-side sealing portion thereof in order to slide on this introduction face during the subsequent assembly of the two members and ultimately to become deformed to such a radial extent that it can be introduced into the annular indentation which axially adjoins it. An additional increase of the radial tolerance range with respect to production and assembly of the two members is therefore connected with the conical introduction face.

Preferably, the conical introduction face does not merge directly into the annular indentation but instead with the interposition of a preferably cylindrical transition face which is constructed on the second member axially between the introduction face and the second sealing face portion.

The annularly self-contained sealing lip is advantageously formed in such a manner that it is already curved in the axially non-compressed neutral state in a convex manner at the radial inner periphery thereof, that is to say, in the direction of the centre of the annular sealing lip. It is particularly advantageous in connection with such a structure if the sealing lip also has at the radially outer side a curvature which is, however, concave when viewed in the axially non-compressed neutral state.

When viewed as a cross-section through the annular member of the sealing lip, the plane of section of which is defined by the axial and radial direction of the seal, the sealing lip preferably has in the axially non-compressed neutral state an arcuately curved form. A banana-like contour could be referred to. A particularly clear preferential direction of the radial curvature of the sealing lip is connected with such a formation if the sealing lip is axially compressed by the two assembled members.

Preferably, the annular seal is fixed to the first member with the base portion thereof with sealing. In this manner, the first member and the seal constitute an integrally manoeuvrable structural unit. This makes it easier to assemble the two members. It is considered to be particularly advantageous for the seal to be formed on the first member in a fluid-tight and pressure-tight manner, which is preferably carried out by means of an injection-moulding method. The structural unit comprising the first member and the seal can in this case be produced in particular by a two-component injection-moulding method, in which a rigid plastics material is used for the first member and a plastics material which has rubber-resilient properties after hardening is used for the seal.

The sealing system is preferably configured in such a manner that the seal spans an axial gap which is present between the two members which are intended to be sealed relative to each other, wherein it is curved or bent radially inwards to different extents in accordance with the axial gap width and the different axial compression of the sealing lip dependent thereon.

The annular seal preferably extends axially between an annular wall portion of the first member and an annular wall portion of the second member. After the assembly of the two members, these two annular wall portions are also arranged with axial spacing from each other so as to leave a gap free, wherein this gap is bridged by the annular seal which is inserted therebetween. In this instance, it is particularly advantageous if a radially continuous, free intermediate space is present between the two wall portions both radially outside and radially inside the sealing lip. In order to keep the danger of contamination as low as possible, the outer intermediate space will be kept as small as possible during the structural configuration of the sealing system. With regard to the inner intermediate space, however, there is advantageously selected a structure which extends from the inner end region of the first sealing face portion over the entire axial length of the sealing lip as far as the first member so that the installation space of the seal at the inner side thereof, that is to say, in the annular space surrounded thereby, is not delimited by a wall. This promotes the free radial deformability of the sealing lip when it is compressed during the axial assembly of the two members and is bent or curved radially inwards.

It is possible with the sealing system according to the invention to obtain between the sealing lip and the second member an ideal compression which is sufficiently great to prevent leaks but which is also not too high so that the connection forces necessary for the assembly of the two members may be relatively small, which again reduces the requirements placed on the strength of the components and consequently also the production costs.

The sealing system can in principle also be produced with an annular seal which is inserted as a movable inlay seal between the two members without being fixed to one of these two members. In this context, a construction of the annular seal is advantageous which is carried out in a mirror-symmetrical manner with respect to the base portion relative to a reference plane which is perpendicular relative to the longitudinal axis of the sealing ring. In this case, the seal has two annular seals which project away from the base portion in mutually opposed axial directions and which each cooperate with one of the two members which are intended to be sealed relative to each other, wherein the first member is constructed identically to the second member in order to cooperate with the sealing lip which is associated therewith.

The sealing system is also preferably provided with fixing means, by which the two first and second members which belong to the sealing system can be or are tensioned with respect to each other axially en bloc. In this instance, there is provision for an axial spacing to be present in the tensioned state between two mutually opposing annular wall portions of the two members, wherein the annular seal which spans the gap and which is in sealing contact with the two members at the same time is inserted in the gap resulting from this axial spacing. Even if the axial spacing between the two annular wall portions varies as a result of tolerances when the two members are in the state tensioned with each other, the annular seal always provides a reliable, fluid-tight and pressure-tight sealing.

The above-mentioned valve is preferably equipped with any feature of the sealing system as described and/or claimed herein. In particular, the valve according to this invention expediently comprises any of the features of the claims which are referring to a sealing system.

BRIEF DESCRIPTION OF THE DRAWINGS

The invention is explained below in greater detail with reference to the appended drawings, in which.

DETAILED DESCRIPTION

The sealing system which is designated 1 in its entirety comprises two first and second members 2, 3 which are constructed separately from each other and an annular seal 4 which preferably comprises a material having rubber-resilient properties and which is used for the mutual sealing of the two members 2, 3.

In the embodiment, the two members 2, 3 represent two housing portions of a valve housing of a valve which serves to control fluid flows. The additional components of the valve are not illustrated for the sake of simplicity. However, the implementation as a valve is only one of many possibilities for producing the sealing system 1. The two members 2, 3 may be components of any devices which are intended to be sealed with respect to each other.

In the assembled state of the sealing system 1 as can be seen in FIGS. 1 to 4, the two members 2, 3 are placed against each other in a joining region 5 in an axial direction which is defined by the axis direction of a notional axial axis 6. The joining operation is carried out by mutual axial approach in the context of an axially orientated joining movement 7 which is indicated by a double-headed arrow.

The assembled state of the two members 2, 3 is particularly defined in that the two members 2, 3 are axially tensioned with respect to each other en bloc. To this end, the sealing system is advantageously provided with fixing means 8. These fixing means 8 include by way of example a first support face 12 which is arranged on the first member 2 and which axially faces the second member 3 and a second support face 13 which is opposite and faces the first support face 12 and which is arranged on the second member 3. In the assembled state of the sealing system 1, the two support faces 12, 13 abut each other and thereby determine the relative axial position between the two members 2, 3. This relative position is fixed by way of example by a tensioning screw 14 which also belongs to the fixing means 8 and which acts on the two members 2, 3 so that they are drawn together and tensioned with respect to each other with the two support faces 12, 13 thereof.

In this assembled state of the sealing system 1, an axial gap 15 which is spanned with sealing by the annular seal 4 which is also referred to below simply as a seal 4 is located between the two members 2, 3 at the other side of the fixing means 8. By way of example, the two members 2, 3 together delimit an inner space 16 which would be freely accessible from the outer side without the seal 4 through the gap 15 but which is sealed in a fluid-tight and pressure-tight manner towards the environment as a result of the seal 4.

The gap 15 is preferably constructed between two annular first and second wall portions 17, 18 of the two members 2, 3, which portions are arranged with axial spacing from each other. The first wall portion 17 belongs to the first member 2 and the second wall portion 18 belongs to the second member 3. Each of these annular wall portions 17, 18 extends all the way round the axial axis 6.

The axial length of the gap 15 is adjusted to a product-specific nominal dimension which can vary in accordance with tolerances. This means for the seal 4 which is inserted between the two wall portions 17, 18 that it has to perform the sealing function thereof for different axial gap widths of the gap 15.

The illustrated construction of the fixing means 8 is merely exemplary. Another construction of the fixing means 8 is also possible.

The first member 2 is provided with the annular seal 4 which has already been mentioned at the front end side 22 which faces the second member 3. The seal 4 has a preferably integral annular sealing member 23 which extends around a longitudinal axis 24 of the seal 4 which extends parallel and preferably coaxially with respect to the axial axis 6 thereof in the assembled state of the sealing system 1.

The seal 4 has an annular base portion 25 which forms an integral component of the sealing member 23. The seal 4 is fixed via this base portion 25 to the front end side 22 of the first wall portion 17 which belongs to the first member 2. The first member 2 and the seal 4 thereby form an integrally manoeuvrable structural unit which simplifies the assembly of the sealing system 1 because this structural unit 2, 4 can be handled in the manner of a single member during the joining movement 7.

The fixed connection between the base portion 25 and the first member 2 is a sealed connection so that an introduction of fluid is not possible in the connection region between the seal 4 and the first member 2.

Advantageously, the seal 4 is formed on the first member 2 in the context of a shaping method. Preferably, this is carried out by injection-moulding, in particular in the context of a so-called two-component injection-moulding method.

The first member 2 advantageously comprises a hard thermoplastic plastics material. The seal 4 is also advantageously produced on a thermoplastic basis but has, in comparison with the first member 2, flexible properties which are in particular deformable in a rubber-resilient manner.

In an embodiment which is not illustrated, the first member 2 comprises metal.

The second member 3 is also a rigid member and comprises a material as mentioned above in connection with the first member 2.

The geometry of the preferably materially engaging connection between the base portion 25 of the seal 4 and the first member 2 is in principle freely selectable. By way of example, the base portion 25 has, in order to obtain a particularly intimate connection, an annular connection projection 26 which engages in an annular groove of the first member 2, which groove is open at the front end side 22.

The annular structure of the seal 4 is not circular in the embodiment but instead rectangular so that a frame-like structure is produced. However, the annular form of the seal 4 may also differ from these forms and, for example, may have a circular or elliptical annular form.

The annular wall portion 18 which belongs to the second member 3 has at the front end side 27 thereof facing the first member 2 a planar arrangement which comprises a plurality of surfaces which perform different functions. Inter alia, this planar arrangement includes an annular sealing face 28 which is concentric with the axial axis 6 and which is also referred to below for simplicity simply as a sealing face 28. This sealing face 28 axially faces the first member 2 and has an annular first sealing face portion 32 and a second sealing face portion 33 which concentrically surrounds the first sealing face portion 32.

The first sealing face portion 32 is constructed conically and extends from an inner end region 32a with an oblique extent as far as an outer end region 32b which is located radially further outwards. The first sealing face portion 32 moves apart in a radially outward direction from the first member 2 so that the outer end region 32b has greater spacing from the front end face 22 of the first member 2 than the inner end region 32a.

The inner end region 32a advantageously merges with a curvature into a peripheral inner circumferential face 34 of the second wall portion 18, which face 34 delimits the inner space 16 in a radially outward direction in the embodiment.

The second sealing face portion 33, which is formed by the base face of an annular indentation 35 of the second annular wall portion 18, adjoins, preferably directly, the outer end region 32b of the first sealing face portion 32. The annular indentation 35 is arranged concentrically with respect to the axial axis 6 and is preferably constructed in a curved manner when viewed in cross-section. The cross-section is intended to be understood to be a section in a plane which is defined by the radial axis 6 and a radial axis 36 which is perpendicular thereto. Wherever reference is made at other locations to a "cross-section", it is in the same plane of section unless other indications are given in the individual case.

The second sealing face portion 33 preferably merges into a cylindrical transition face 37 which is orientated radially inwards at the side thereof opposite the first sealing face portion 32. The transition between the transition face 37 and the second sealing face portion 33 is stepless and gapless as is the transition between the second sealing face portion 33 and the first sealing face portion 32.

The cylindrical transition face 37 adjoins the second sealing face portion 33 at the side facing the first member 2 and could in principle extend as far as a front end face 38 of the second wall portion 18, which face is nearest the first member 2. It is advantageous, however, if there adjoins the transition face 37 an introduction face 42 which is directed axially in the direction towards the first member 2 and at the same time radially inwards and the diameter of which increases from the transition face 37 in the direction towards the first member 2. With respect to the axial axis 6, the introduction face 42 is advantageously provided with a smaller cone angle than the first sealing face portion 32.

The introduction face 42 opens at the front end face 38 of the second wall portion 18.

The annular seal 4 has an annular sealing lip 43 which adjoins the base portion 25 and which projects therefrom axially in the direction towards the second member 3. This sealing lip 43 is also preferably arranged coaxially with respect to the axial axis 6.

The sealing lip 43 has a sealing portion 44 which is axially opposite the base portion 25 and which is formed by the free end of the sealing lip 43. This sealing portion 44 is preferably rounded when viewed in cross-section, in particular with a radius which corresponds at least substantially to the radius of the second sealing face portion 33.

Unlike the embodiment, the sealing portion 44 could also terminate with a sealing edge. The second sealing face portion 33 could also, unlike the preferred rounded cross-sectional shape, have an angular cross-sectional contour, which is not illustrated in the drawings, however.

The sealing lip 43 tapers from the base portion 25 towards the sealing portion 44. Preferably, a continuous tapering is involved. The tapering is in such a form that the radially measured thickness of the sealing lip 43 decreases from the base portion 25 as far as the sealing portion 44.

Figure 5:
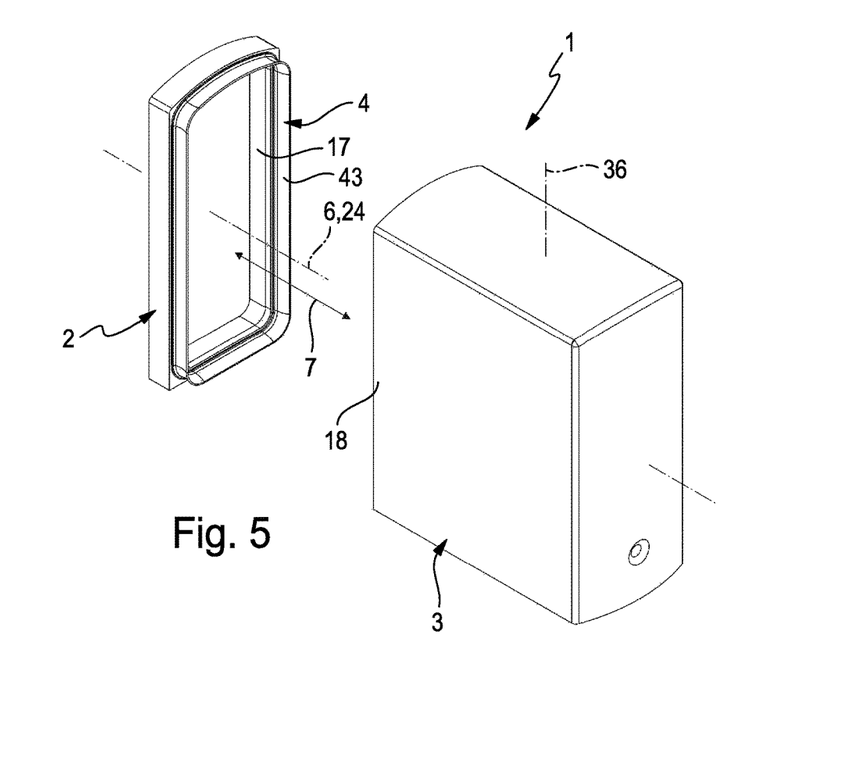
FIG. 5 shows the sealing system of FIGS. 1 to 4 in the not-yet-assembled state of the two members during the joining process, in which the two members approach each other in an axial direction.

The diameter of the seal 4 preferably corresponds at least substantially to the diameter of the annular sealing face 28. Consequently, the seal 4 and the sealing face 28 are axially directly opposite each other if the two members 2, 3 are orientated coaxially with respect to each other before the assembly, as illustrated in FIG. 5.

The sealing lip 43 is preferably constructed in such a manner that it is curved in a convex manner at the radial inner face 45 thereof in the tension-neutral state which is not yet engaged with the second member 3 and is curved in a concave manner at the radial outer face 46 thereof which is opposite in this regard. These action indications relate to the cross-section of the seal 4 as can be seen in the drawing. It is also possible to say that the radial inner face 45 has a convex-curved extent from the base portion 25 in the direction towards the sealing portion 44 while the radial outer face 46 has a concave-curved extent from the base portion 25 in the direction towards the sealing portion 44.

If the sealing lip 43 is considered in three dimensions, the convex outer contour is in the form of a concentric contraction. However, the inner contour is in the form of a trumpet-like expansion in the direction towards the sealing portion 44.

Therefore, the sealing lip 43 is thereby curved in an arcuate manner over the length thereof, for example, comparable with the curvature of a banana.

In an embodiment of the seal 4 which is not shown, a convex curvature is also present on the radial inner face 45 while the radial outer face 46 is formed in a cylindrical manner, however, or also has a convex curvature, the radius of curvature of which is smaller than that of the radial inner face 45, however.

The selected shaping of the sealing lip 43 advantageously involves the fact that the sealing lip 43 curves radially inwards in the intermediate region 47, which is located between the base portion 25 and the sealing portion 44, with resilient deformation if an axial connection force FF is applied to the sealing portion 44. This axial connection force FF is produced when the two members 2, 3 are joined because the seal 4 and the two members 2, 3 are adapted to each other in such a manner that the sealing portion 44 moves into abutment during the joining movement 7 against the annular sealing face 28 of the second member 3 before the fixing means 8 abut each other en bloc.

This means that the sealing lip 43 is in any case axially compressed in the assembled state of the sealing system 1 so that the length thereof measured in the axial direction of the axial axis 6 is less than in the non-deformed neutral state.

The sealing system 1 is preferably configured in terms of the nominal dimensions thereof so that the seal 4 is introduced directly into the annular indentation 35 during the joining movement 7 with the sealing portion 44 thereof and moves into abutment with the associated second sealing face portion 33.

FIGS. 5, 6, 7, 8 and 4 illustrate successive phases of a preferred joining operation during the assembly of the sealing system 1.

Figure 6:
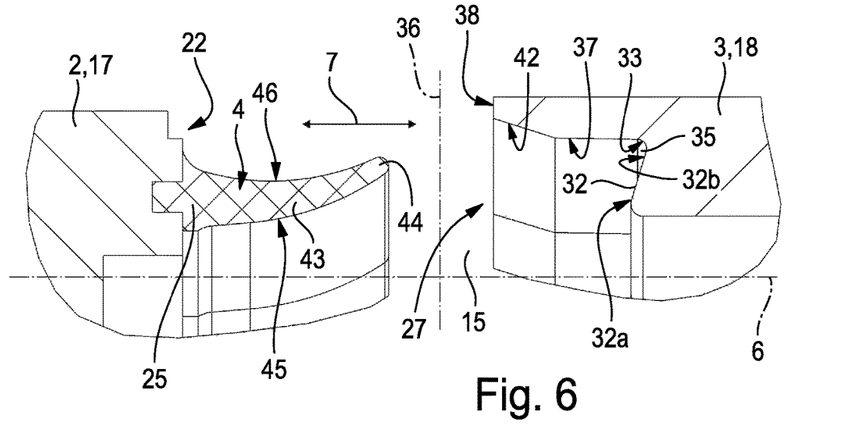
FIGS. 6-8 are illustrations corresponding to the enlarged cutout of FIG. 4 of various phases during the assembly of the two members of the sealing system.

FIGS. 5 and 6 represent a starting state, in which the two members 2, 3 are arranged with a relatively large axial spacing from each other but are already orientated coaxially with respect to each other so that the annular seal 4 is at least substantially aligned axially with the annular sealing face 28 of the second member 2.

During the subsequent joining movement 7, the two members 2, 3 are brought axially closer together, wherein the seal 4 which is fixed to the first member 2 also carries out the movement of the first member 2. The joining movement 7 may be a simultaneous movement of both members 2, 3 or a movement of only one of these two members 2, 3 with the other member 3, 2 remaining fixed in position.

Figure 7:
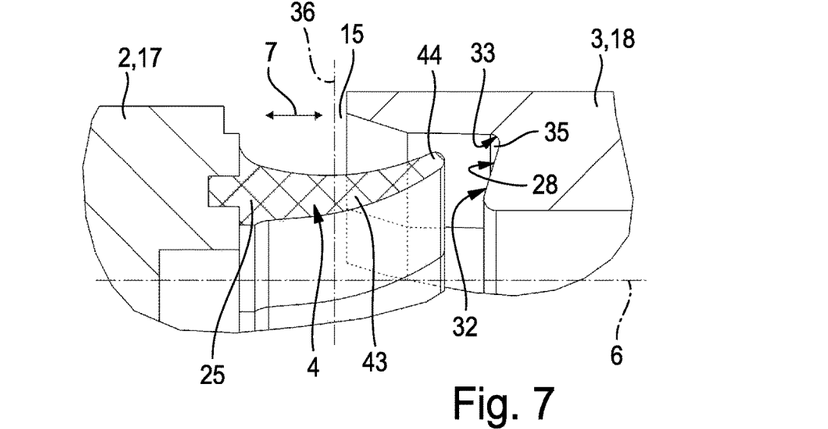

FIG. 7 shows a joining phase in which the annular seal 4 with the sealing lip 43 thereof in front is introduced slightly into the region which is surrounded by the annular second wall portion 18. The sealing lip 43 is in this case surrounded by the introduction face 42 and the transition face 37 over a portion of the length thereof in the region of the outer periphery thereof with radial spacing. The sealing portion 44 is axially spaced apart from the annular sealing face 28.

Figure 8:
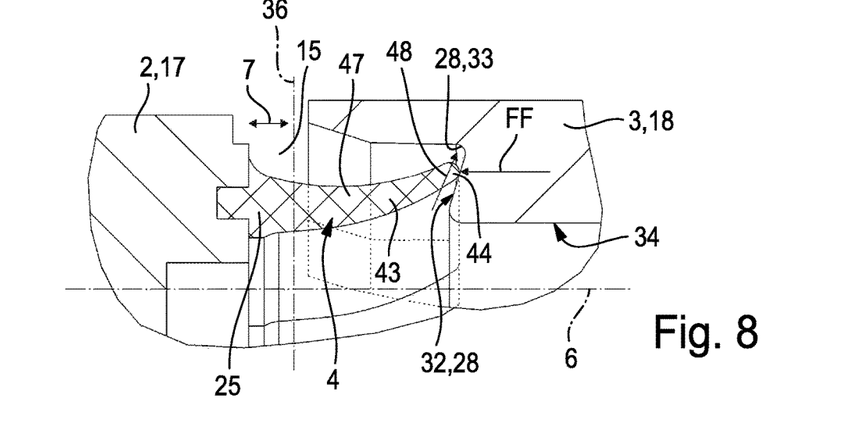

FIG. 8 shows a phase of the joining operation, in which the sealing lip 43 has moved into abutment with the sealing portion 44 thereof against the first sealing face portion 32 of the sealing face 28. As a result of deviations caused by tolerances, the sealing portion 44 does not move directly into the annular indentation 35 in this instance.

During the subsequent joining movement 7, the sealing portion 44 is subjected as a result of the first sealing face portion 32 to action by the axial connection force FF which has already been mentioned. This results in the sealing lip 43 being axially compressed but at the same time sliding on the first sealing face portion 32 obliquely in a radially outward direction in accordance with the arrow 48 and thereby being redirected in the direction towards the annular indentation 35.

This redirection movement ends when the sealing lip 43 has been deformed outwards to such an extent that the sealing portion 44 thereof has reached the annular indentation 35 and at that location has moved into contact with the second sealing face portion 33.

Figures 1, 2, 3:
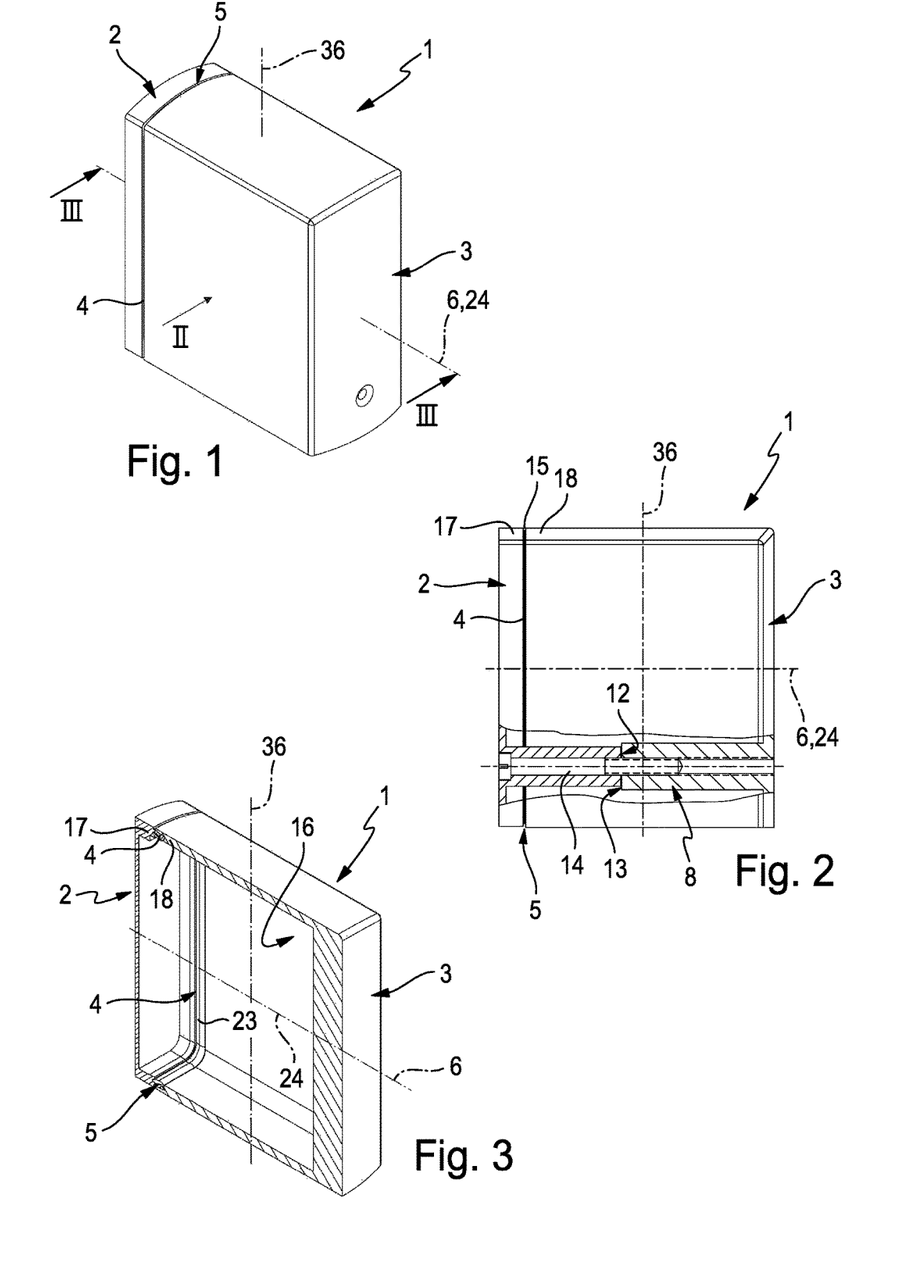
FIG. 1 is a perspective view of a preferred first embodiment of the sealing system according to the invention and in particular in an implementation in a valve.
FIG. 2 is a side view of the sealing system from FIG. 1 when viewed in accordance with arrow II, wherein the illustration is partially broken away in order to show internal fixing means, via which the two members are tensioned with respect to each other en bloc.
FIG. 3 is a longitudinal section through the sealing system in accordance with plane of section III-III from FIG. 1, wherein the fixing means are not illustrated for the sake of greater clarity.
Figure 4:
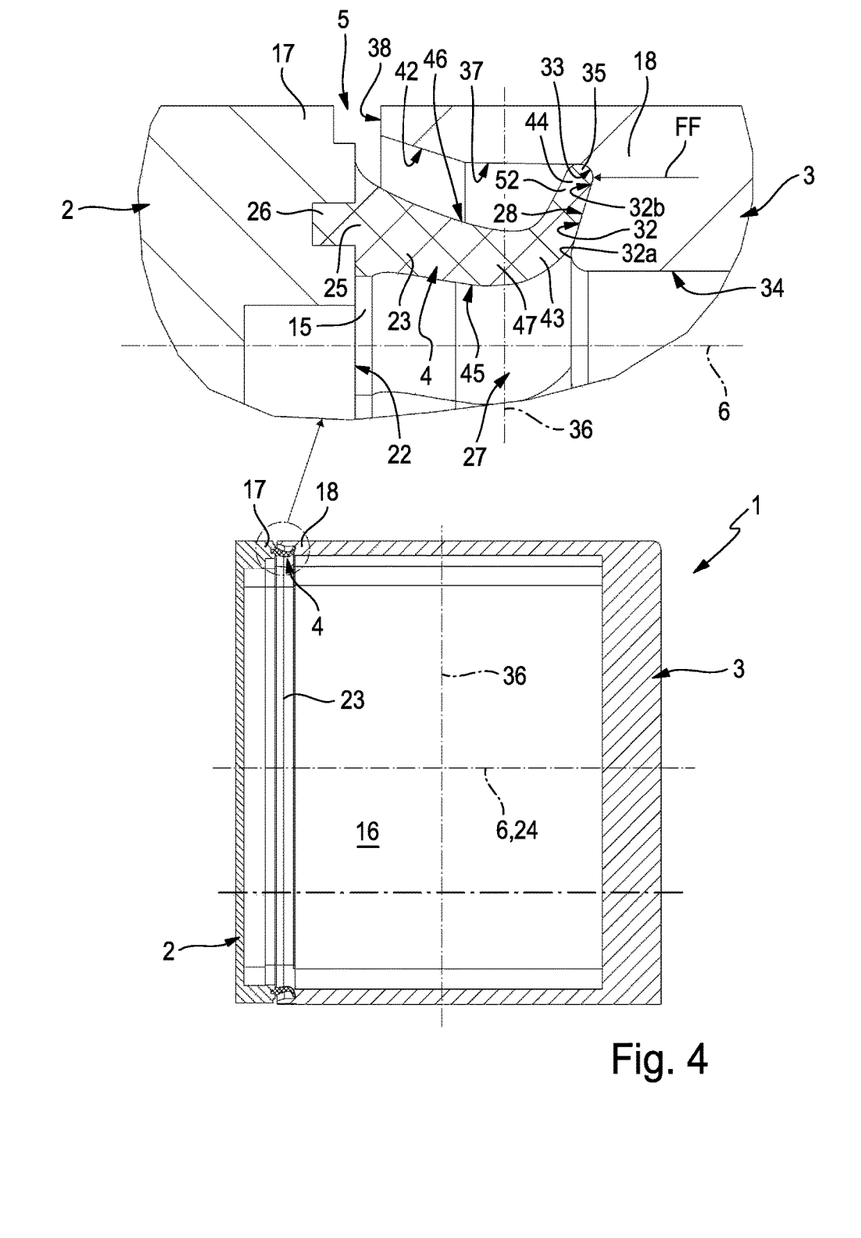
FIG. 4 is the same longitudinal section as FIG. 3, but with a two-dimensional depiction, wherein a cutout which is bounded with dot-dash lines is also illustrated separately to an enlarged scale in the region of the annular sealing lip which takes up the position for use thereof.

FIG. 4 shows the final state of the joining movement 7 with a completely assembled sealing system 1. In this case, it is possible to see the maximum curvature of the sealing lip 43 which is already bent forwards in the neutral state in the intermediate region 47 thereof in a radially inward direction. The reason for this is that the sealing lip 43 in comparison with the intermediate state of FIG. 8 has been axially compressed even further because the sealing face 28 has been moved even further towards the first member 2 during the joining movement 7.

The operation of the radially inwardly directed curvature of the sealing lip 43 can also be considered to be a bending operation.

In any case, this deformation also preferably has the effect that the sealing lip 43 adjoins the conical first sealing face portion 32 with the front end portion 52 thereof which adjoins the sealing portion 44. This increases the sealing quality and further ensures a very good mechanical support of the sealing lip 43 against forces which act on the sealing lip 43 from a radially outer side. Such forces may be in particular pressure forces which result from a pressure, which is higher in comparison with the pressure present in the inner space 16, in the environment of the sealing system 1.

The degree of radial curvature of the sealing lip 43 is dependent on the extent to which the two members 2, 3 are moved towards each other during the joining operation thereof. Preferably, the sealing system 1 is configured in any case so that the axial gap 15 already mentioned above is also present between the two wall portions 17, 18 when the two members 2, 3 have taken up the relative assembly end position thereof as a result of the fixing means 8 or other measures, which end position is illustrated in the embodiment in FIG. 4. The annular seal 4 is located in this instance in the position for use thereof.

The radially continuous gap 15 which is present between the two wall portions 17, 18 is closed by the seal 4. The two members 2, 3 are constructed in particular so that the seal 4 at the radial inner side thereof having the radial inner face 45 is exposed over the entire length thereof in a radially inward direction from the inner end region 32a of the first sealing face portion 32 as far as the base portion 25 which is fixed to the first member 2 and is not flanked by either of the two members 2, 3 and in particular not by either of the two wall portions 17, 18. Consequently, the installation space for the seal 4 is not limited in a radially inward direction and allows the seal 4 optimum resilient deformation for adaptation to the respective relative position between the two members 2, 3.

Figure 9:
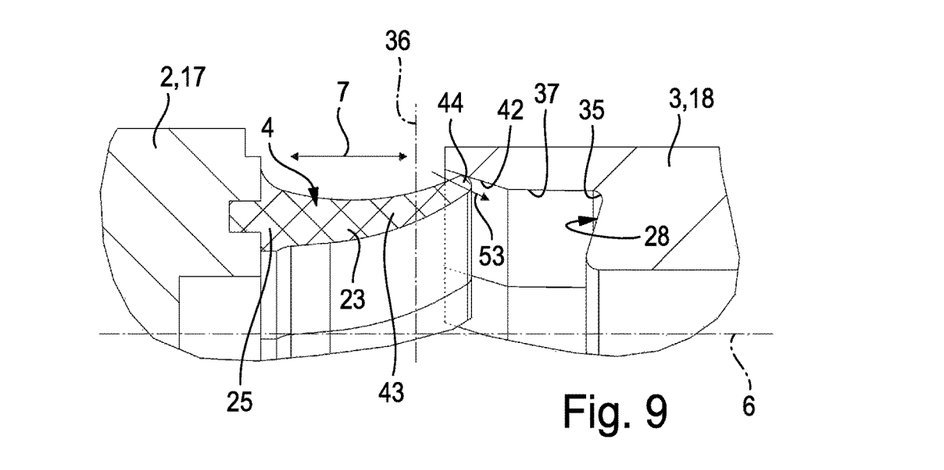
FIG. 9 is an illustration corresponding to FIGS. 6 to 8 of another phase of the assembly of two members, wherein such a radial offset is shown that the sealing lip cooperates with a preferably present introduction face of the second member.

The advantage which is connected with the oblique introduction face 42 when viewed in cross-section is particularly evident in FIG. 9. FIG. 9 shows the operation of the axial assembly of the two members 2, 3, wherein as a result of tolerances a slight radial offset is present between the two members 2, 3 so that the sealing lip 43 is at least partially located radially further outwards with the end-side sealing portion 44 thereof with respect to the opposing annular indentation 35. In this instance, during the joining movement 7 the sealing lip 43 strikes the introduction face 42 with the sealing portion 44 and slides thereon radially inwards in an oblique manner during the continuation of the joining movement 7 in accordance with the arrow 53 so that it is resiliently inwardly bent. During the continuing joining movement 7, the sealing portion 44 consequently moves initially into contact with the transition face 37 which adjoins the introduction face 42 and from there moves directly into the annular indentation 35 and consequently into sealing contact with the second sealing face portion 33 of the sealing face 28, which portion is formed by the base face of the annular indentation 35.

Significant advantages and features of the preferred embodiment of the sealing system 1 will be set out again below.

As a result of the special shaping of the annular seal 4 and the connection members which are formed by the two members 2, 3, both large production tolerances and large assembly tolerances are allowed with little spatial requirement. The seal 4 can be constructed as a structural unit with the first member 2, in particular using two-component technology, or can be used as an inlay seal which is separate with respect to the two members 2, 3.

As a result of the relatively large production and assembly tolerances allowed, it is possible to produce the individual components of the sealing system 1 in a cost-effective manner and also to mount them in a reliable and economic manner with automated methods. A greater level of configuration freedom is produced for the design engineer.

The operating principle of the annular seal 4 is economical both for large batch numbers and for small batch numbers. In the case of large to very large batch numbers, a tool-free two-component solution is advantageous, wherein the seal is injection-moulded on the first member 2. The subsequent sequential assembly can be highly automated. A production of the seal 4 as a separate inlay seal is particularly advantageous in the case of small and medium batch numbers.

With little requirement for installation space, the seal 4 allows a large tolerance compensation both in an axial direction defined by the axis direction of the axial axis 6 and in a radial direction which is defined by the axis direction of the radial axis 36. In particular in connection with the oblique introduction face 42, a self-centring action of the sealing portion 44 is produced for radial positional deviations. The conical first sealing face portion 32 which is axially opposite the sealing lip 43 can also ensure in the case of positional deviations that the axial connection force FF is introduced into the sealing lip 43 as desired when the sealing system 1 is assembled. It further allows the sealing portion 44 to slide off and consequently allows positional changes of the sealing portion 44 when the sealing system is used without the sealing contact becoming lost. Such positional deviations may occur as a result of changing pressure differences between the radial outer side and the radial inner side of the sealing lip 43.

Preferably, a fluid pressure support of the sealing function is produced both in the event of excess pressure and in the event of reduced pressure of the medium which is radially applied to the seal 4, wherein this medium is particularly air. The pressing pressure is thereby prevented from being produced at the sealing location, that is to say, in the contact region between the sealing portion 44 and the sealing face 28, only by a simple pretensioning of the elastomer material of the sealing lip 43.

The narrow cross-sectional shape of the sealing lip 43 reduces the axial connection forces during assembly of the two members 2, 3 without this becoming disadvantageous for the sealing quality.

During the axial compression of the sealing lip 43, a clear curving or bending direction is produced for the intermediate region 47 of the sealing lip 43 in a radially inward direction so that reproducible geometric conditions are always present.

What is claimed is:

1. A sealing system having an annular seal which in its position for use is inserted axially between two first and second members and is in sealing contact with these two members, which two members are opposite each other in an axial direction and are intended to be sealed relative to each other, wherein the annular seal has, in order to seal with respect to at least the second member, an annular sealing projection which extends axially from a base portion in the direction towards the second member and which abuts with a freely ending, end-side sealing portion against an annular sealing face of the second member facing the first member, and wherein the annular sealing face of the second member has a conical first sealing face portion which extends obliquely in a radially outward direction and axially away from the first member from an inner end region to an outer end region and which merges at its outer end region into a second sealing face portion of the annular sealing face which is formed by the base face of an annular indentation of the second member, and wherein the sealing projection is formed by a sealing lip which tapers in the direction towards the sealing portion and which in the position for use of the seal is axially compressed and radially deformed by axial action by means of the annular sealing face of the second member, whereby the sealing lip is curved radially inwards with resilient deformation in an intermediate region which is located between the sealing portion and the base portion.

2. The sealing system according to claim 1, wherein the sealing lip in the position for use of the seal immerses into the annular indentation with the end-side sealing portion thereof.

3. The sealing system according to claim 1, wherein the sealing lip abuts the conical first sealing face portion with the end-side sealing portion thereof in a radially slidingly displaceable manner.

4. The sealing system according to claim 1, wherein the sealing lip is rounded on the end-side sealing portion thereof.

5. The sealing system according to claim 1, wherein the second sealing face portion, when viewed in cross-section, is designed in a curved manner.

6. The sealing system according to claim 1, wherein the sealing lip in the axially non-compressed neutral state thereof is curved in a convex manner at the radially inner side.

7. The sealing system according to claim 1, wherein the sealing lip in the axially non-compressed neutral state thereof is curved in a concave manner at the radially outer side.

8. The sealing system according to claim 1, wherein the sealing lip in the axially non-compressed neutral state thereof is curved in an arcuate manner beginning from the base portion as far as the end-side sealing portion, wherein the concave curvature side is associated with the radial outer side of the sealing lip when viewed as a cross-section of the sealing lip.

9. The sealing system according to claim 1, wherein the seal is fixed to the first member with the base portion thereof with sealing so that the first member and the seal form an integrally manoeuvrable structural unit.

10. The sealing system according to claim 1, wherein the seal spans an axial gap which is present between the two members, wherein the sealing lip thereof is or can be curved radially inwards to different extents in accordance with the axial gap width.

11. The sealing system according to claim 1, wherein the annular seal extends axially between an annular wall portion of the first member and an annular wall portion of the second member, wherein these two annular wall portions are arranged in the position for use of the seal with axial spacing from each other so as to form a gap which is axially bridged by the seal, wherein the seal is not covered by the two wall portions at the radial inner side thereof beginning from the inner end region of the first sealing face portion which is arranged on the second member over the entire axial length thereof as far as the base portion.

12. The sealing system according to claim 1, wherein it comprises fixing means, by which the two first and second members which belong to the sealing system can be or are tensioned with respect to each other axially en bloc, wherein the annular seal is interposed between two annular wall portions of the two members arranged with axial spacing from each other and spans an axial gap present between the two wall portions with sealing.

13. The sealing system according to claim 1, wherein the second member has a conical introduction face which is located upstream of the annular indentation in the direction towards the first member and which is orientated axially in the direction towards the first member and at the same time radially inwards and on which the sealing lip can slide during the axial assembly of the two members with the end-side sealing portion thereof.

14. The sealing system according to claim 13, wherein a radially inwardly directed cylindrical transition face is provided on the second member axially between the conical introduction face and the annular indentation.

15. The sealing system according to claim 1, wherein the seal is formed with sealing on the first member with the base portion thereof.

16. The sealing system according to claim 15, wherein the seal is formed on the first member with the base portion thereof by means of injection-moulding.

17. A valve for controlling fluid flows having a valve housing which comprises two housing portions which form two first and second members of a sealing system which are opposite each other in an axial direction and which are intended to be sealed relative to each other, which sealing system further has an annular seal which is inserted axially between the two members and is in sealing contact with these two members in its position for use, wherein the annular seal has, for sealing with respect to at least the second member, an annular sealing projection which extends from a base portion axially in the direction towards the second member and which abuts with a freely ending, end-side sealing portion against an annular sealing face of the second member facing the first member, wherein the annular sealing face of the second member has a conical first sealing face portion which extends obliquely in a radially outward direction and axially away from the first member from an inner end region to an outer end region and which merges at its outer end region into a second sealing face portion of the annular sealing face which is formed by the base face of an annular indentation of the second member, wherein the sealing projection is formed by a sealing lip which tapers in the direction towards the sealing portion and which in the position for use of the seal is axially compressed and radially deformed by axial action by means of the annular sealing face of the second member, whereby the sealing lip is curved radially inwards with resilient deformation in an intermediate region which is located between the sealing portion and the base portion.

18. The valve according to claim 17, wherein the second sealing face portion, when viewed in cross-section, is designed in a curved manner.

19. The valve according to claim 17, wherein the second member has a conical introduction face which is located upstream of the annular indentation in the direction towards the first member and which is orientated axially in the direction towards the first member and at the same time radially inwards and on which the sealing lip can slide during the axial assembly of the two members with the end-side sealing portion thereof, and wherein a radially inwardly directed cylindrical transition face is provided on the second member axially between the conical introduction face and the annular indentation.

20. The valve according to claim 17, wherein the sealing lip in the axially non-compressed neutral state thereof is curved in an arcuate manner beginning from the base portion as far as the end-side sealing portion, wherein the concave curvature side is associated with the radial outer side of the sealing lip when viewed as a cross-section of the sealing lip.

21. A sealing system having an annular seal which in its position for use is inserted axially between two first and second members and is in sealing contact with these two members, which two members are opposite each other in an axial direction and are intended to be sealed relative to each other, wherein the annular seal has, in order to seal with respect to at least the second member, an annular sealing projection which extends axially from a base portion in the direction towards the second member and which abuts with a freely ending, end-side sealing portion against an annular sealing face of the second member facing the first member, and wherein the annular sealing face of the second member has a conical first sealing face portion which extends obliquely in a radially outward direction and axially away from the first member from an inner end region to an outer end region and which merges at its outer end region into a second sealing face portion of the annular sealing face which is formed by the base face of an annular indentation of the second member, and wherein the sealing projection is formed by a sealing lip which tapers in the direction towards the sealing portion and which in the position for use of the seal is axially compressed by axial action by means of the annular sealing face of the second member wherein the sealing lip is curved radially inwards with resilient deformation in an intermediate region which is located between the sealing portion and the base portion, wherein the first member comprises an annular groove open at a front end side facing the annular sealing face of the second member, and wherein the annular seal further comprises an annular connection projection extending axially from the base portion in a direction towards the first member, the annular projection being received within the annular groove of the first member, and wherein the annular seal is formed in the annular groove of the first member by injection-molding so that the base portion of the annular seal is sealed on the first member.

22. A valve for controlling fluid flows having a valve housing which comprises two housing portions which form two first and second members of a sealing system which are opposite each other in an axial direction and which are intended to be sealed relative to each other, which sealing system further has an annular seal which is inserted axially between the two members and is in sealing contact with these two members in its position for use, wherein the annular seal has, for sealing with respect to at least the second member, an annular sealing projection which extends from a base portion axially in the direction towards the second member and which abuts with a freely ending, end-side sealing portion against an annular sealing face of the second member facing the first member, wherein the annular sealing face of the second member has a conical first sealing face portion which extends obliquely in a radially outward direction and axially away from the first member from an inner end region to an outer end region and which merges at its outer end region into a second sealing face portion of the annular sealing face which is formed by the base face of an annular indentation of the second member, wherein the sealing projection is formed by a sealing lip which tapers in the direction towards the sealing portion and which in the position for use of the seal is axially compressed by axial action by means of the annular sealing face of the second member wherein the sealing lip is curved radially inwards with resilient deformation in an intermediate region which is located between the sealing portion and the base portion, wherein the first member comprises an annular groove open at a front end side facing the annular sealing face of the second member, and wherein the annular seal further comprises an annular connection projection extending axially from the base portion in a direction towards the first member, the annular projection being received within the annular groove of the first member, and wherein the annular seal is formed in the annular groove of the first member by injection-molding so that the base portion of the annular seal is sealed on the first member.

* * * * *